United States Patent [19]

Kawai et al.

[11] Patent Number: 4,869,073
[45] Date of Patent: Sep. 26, 1989

[54] AIR CONDITIONER WITH AUTOMATIC SELECTION AND RE-SELECTION FUNCTION FOR OPERATING MODES

[75] Inventors: Nobuo Kawai, Fujinomiya; Satoshi Miwa, Shizuoka, both of Japan

[73] Assignee: Kabushiki Kaisha Toshiba, Kawasaki, Japan

[21] Appl. No.: 195,626

[22] Filed: May 18, 1988

[30] Foreign Application Priority Data

May 19, 1987 [JP] Japan ................... 62-121852

[51] Int. Cl.⁴ ............................................. F25B 13/00
[52] U.S. Cl. ..................................... 62/160; 62/176.6; 236/44 C
[58] Field of Search .............. 62/160, 176; 165/29, 165/26, 21; 236/44 C

[56] References Cited

U.S. PATENT DOCUMENTS 4,102,389  7/1978  Wills ............................. 62/158 X
4,350,023  9/1982  Kuwabara et al. ............. 236/44 C

FOREIGN PATENT DOCUMENTS 59-13663  3/1984  Japan .
59-38495  9/1984  Japan .
60-24888  6/1985  Japan .

Primary Examiner—William E. Wayner
Attorney, Agent, or Firm—Cushman, Darby & Cushman

[57] ABSTRACT

A heat-pump type refrigeration cycle includes at least a compressor capable of switching between cooling and heating modes. A first memory stores first reference temperature data for the cooling mode, and second reference temperature data for the heating mode. A second memory stores first set data for setting a cooling temperature and second set data for setting a heating temperature. A mode selector compares room temperature detection data with the first and second reference temperature data, in accordance with an automatic operation instruction, and outputs a first signal for selecting the cooling mode or a second signal for selecting the heating mode. A controller sets the heat-pump type refrigeration cycle in the cooling or heating mode, in accordance with the first or second signal, and controls the compressor in a drive state or a stop state, so that a comparison difference between the first or second set data and the room temperature detection data becomes zero. A monitor is connected to monitor the stop state of the compressor, and, when the stop state continues for a predetermined period of time or longer, to provide a re-selection instruction equivalent to the automatic operaiton instruction to the mode selector.

14 Claims, 6 Drawing Sheets

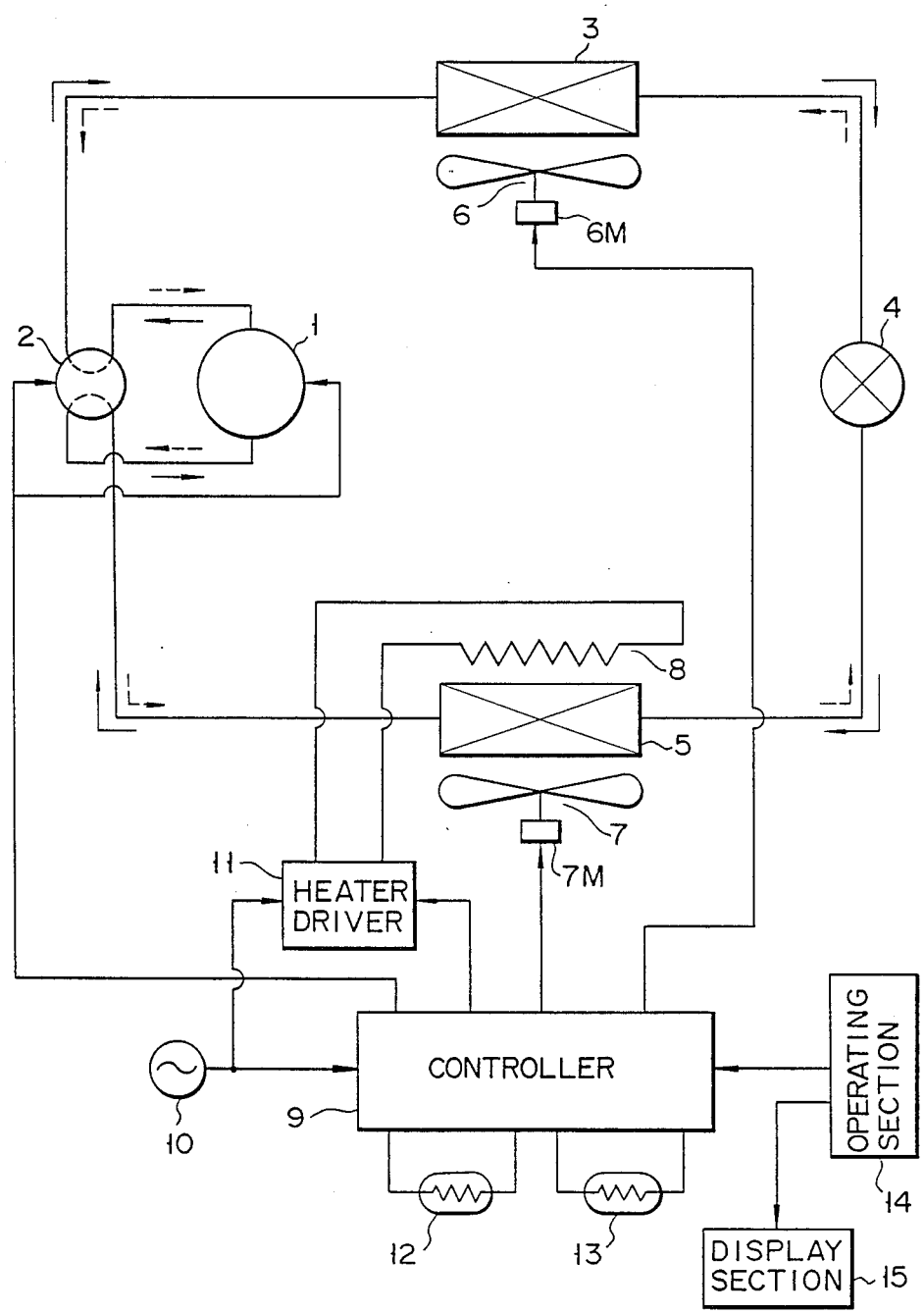
F I G. 1

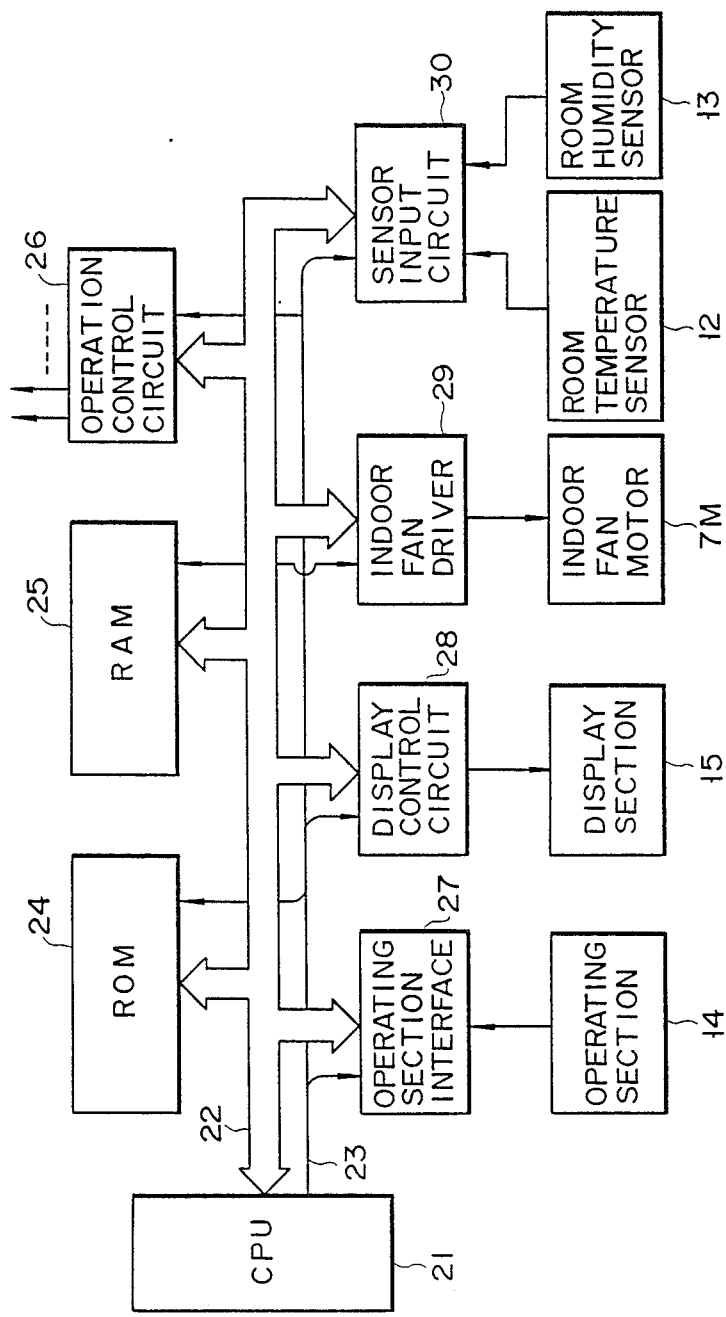
F I G. 2

AIR CONDITIONER WITH AUTOMATIC SELECTION AND RE-SELECTION FUNCTION FOR OPERATING MODES

BACKGROUND OF THE INVENTION

1. Field of the Invention

This invention generally relates to an air conditioner and, more particularly, to an air conditioner with automatic selection and re-selection functions for operating modes.

2. Description of the Related Art

The so-called heat-pump type air conditioner now represents a major trend in air conditioners, being capable of operation in both cooling and heating modes.

Some conventional air conditioners have an automatic mode selection opeation function for comparing a current room temperature with a preset reference temperature and for automatically selecting one of "cooling", "dehumidifying", "blowing", and "heating" operating modes, based on the comparison result. According to one mode selection control method of such a conventional air conditioner, a current room temperature is detected at the beginning of an automatic mode selection operation and the detected value is compared with the corresponding reference value so as to determine the appropriate operating mode. Thereafter, the mode is left unchanged, unless an operation stop instruction is supplied.

According to another mode selection control method, the current room temperature is continuously compared with a set reference value in order to change operating mode if and as required.

When the former control method is employed, the operating mode cannot be changed even if a load such as the room temperature or room humidity varies after commencement of the selected operation mode. In such a case, the air conditioner continues operating in what has now become an inappropriate mode, thus creating discomfort for the occupants of the room being air conditioned. On the other hand, when the latter control method is employed, if the room temperature increases/decreases even slightly in relation to the reference temperature, the operating mode will likely alternate unnecessarily frequently from one mode to another, thereby resulting in inconsistent temperature of the room and, as before, discomfort for any occupant of the room.

As has been described above, according to the air conditioner having a conventional automatic mode selection operation function, user comfort can be a problem, as an appropriate operating mode cannot easily be selected automatically to suit any change in load. As a result, there is now demand for an air conditioner device having an improved automatic mode selection function.

SUMMARY OF THE INVENTION

It is, therefore, an object of the present invention to provide a new and improved air conditioner featuring automatic selection and re-selection of operating modes, as a result of which user comfort can be greatly improved, and which can easily re-select automatically an operating mode appropriate to a variation in load.

According to the present invention, there is provided an air conditioner comprising:

refrigeration cycle means including at least a compressor, an outdoor heat exchanger, a decompressor, and an indoor heat exchanger, and constituting a heatpump type refrigeration cycle capable of switching between cooling and heating operating modes;

room temperature detection means for providing room temperature detection data;

first memory means, for storing first reference temperature data for the cooling operating mode, and second reference temperature data for the heating operating mode;

second memory means, for storing first set temperature data for setting a cooling temperature and second set temperature data for setting a heating temperature;

automatic operation instruction means for providing an automatic operation instruction in an initial state;

operating mode selection means, connected to the automatic operation instruction means, the room temperature detection means, and the first memory means, for comparing the room temperature detection data with the first and second reference temperature data, in accordance with the automatic operation instruction, and for outputting a first selection signal for selecting the cooling operating mode or a second selection signal for selecting the heating operating mode;

control means, connected to the operating mode selection means, the room temperature detection means, the second memory means, and the refrigeration cycle means, for setting the heat-pump type refrigeration cycle in the cooling or heating operating mode, in accordance with the first or second selection signal, and controlling the compressor in a drive state or in a stop state, so that a comparison difference between the first or second set temperature data and the room temperature detection data becomes zero; and monitor means which is connected to monitor the stop state of the compressor in the refrigeration cycle means, and, when the stop state continues for a predetermined period of time or longer, to provide the operating mode selection means with a re-selection instruction equivalent to the automatic operation instruction.

BRIEF DESCRIPTION OF THE DRAWINGS

These and other objects and features of the present invention can be understood through the following embodiments by reference to the accompanying drawings, in which:

FIGS. 1 to 5 show an embodiment of the present invention, in which

FIG. 1 is a block diagram showing the overall arrangement of an air conditioner, FIG. 2 is a block diagram showing an arrangement of a main part of a controller, FIG. 3 shows a table for storing condition data upon automatic operating mode selection, and FIGS. 4 and 5A and 5B are respectively a block diagram and flow charts for explaining an operation of a CPU.

DETAILED DESCRIPTION OF THE PREFERRED EMBODIMENTS

Figure 3:
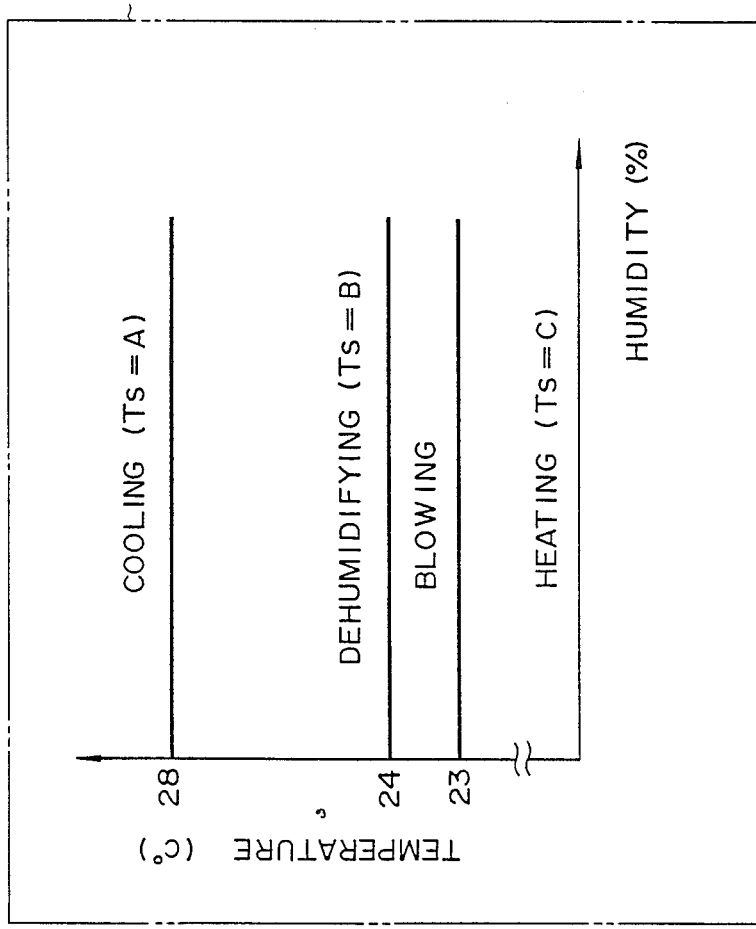

An embodiment of the present invention will now be described, with reference to the accompanying drawings.

FIG. 1 is a diagram showing the overall arrangement of an embodiment of an air conditioner according to the present invention. The air conditioner incorporates a heat-pump type refrigeration cycle constituted by sequentially communicating compressor 1, four-way valve 2, outdoor heat exchanger 3, expansion valve 4 serving as a decompressor, and indoor heat exchanger 5. Outdoor fan 6 is provided near outdoor heat exchanger 3, and indoor fan 7 and electric heater (re-heating heater) 8 are provided near indoor heat exchanger 5. Thus, the air conditioner shown in FIG. 1 allows cooling, heating, dehumidifying, and blowing operations to be performed.

More specifically, in the case of the cooling operation being performed, a high-temperature refrigerant from compressor 1 is circulated, in the following order, in outdoor heat exchanger 3, expansion valve 4, and indoor heat exchanger 5 through four-way valve 2, (in the direction indicated by solid arrows in FIG. 1) thereby forming a cooling cycle in which outdoor heat exchanger 3 serves as a condenser, and indoor heat exchanger 5 serves as an evaporator. Indoor fan 7 is operated to blow indoor air into indoor heat exchanger 5, in which cooling and dehumidification is performed, and from which, as a result, cold air is blown out.

When the dehumidifying operation is performed, the cooling cycle as described above is formed, and air cooled and dehumidified by indoor heat exchanger 5 is heated by re-heating heater 8, as a result of which, dehumidified air is blown out.

When the heating operation is performed, four-way valve 2 is switched so as to circulate a high-temperature refrigerant from compressor 1, in the order of indoor heat exchanger 5, expansion valve 4, and outdoor heat exchanger 3, (in the direction indicated by broken arrows in FIG. 1) thus forming a heating cycle in which outdoor heat exchanger 3 serves as an evaporator, and indoor heat exchanger 5 serves as a condenser. Indoor fan 7 is operated so as to blow indoor air into indoor heat exchanger 5, where it is heated, and from which warm air is then blown out.

When the blowing operation is performed, compressor 1 is stopped, and indoor fan 7 is operated in order to circulate indoor air through indoor heat exchanger 5.

Referring to FIG. 1, controller 9 comprises a microcomputer (CPU) and its peripheral circuit, and is connected to commercial AC power supply 10. Controller 9 is also connected to compressor 1 and four-way valve 2, as well as to outdoor fan motor 6M for driving outdoor fan 6, indoor fan motor 7M for driving indoor fan 7, heater driver 11 for driving heater 8, room temperature sensor 12 for measuring a room temperature, room humidity sensor 13 for measuring a room humidity, operating section 14 for outputting start instructions for "heating", "cooling", "dehumidifying", and "blowing" operating modes, and also a start instruction for an automatic mode selection operation, and to display section 15 for displaying a selected operating mode, a set temperature, and the like.

FIG. 2 is a block diagram showing an arrangement of the main part of controller 9. CPU 21 performs predetermined comparison and arithmetic operations (to be described later) and timer operations based on various instruction data from operating section 14 or temperature and humidity detection data from sensors 12 and 13. For this purpose, CPU 21 exchanges data and control signals for operating ROM 24, for storing permanent data such as operation control programs for the operating modes, and RAM 25 for storing variable data, via bus line 22 and control line 23. CPU 21 is also connected to operation control circuit 26, operating section interface 27, display control circuit 28, indoor fan driver 29, sensor input circuit 30, and the like, via bus line 22 and control line 23. In response to an opeation instruction from CPU 21, operation control circuit 26 operates compressor 1, four-way valve 2, outdoor fan motor 6M, heater driver 11, and the like. Operating section interface 27 receives various instruction signals from operating section 14, and sends them to CPU 21. Display control circuit 28 performs drive control of display section 15. Indoor fan driver 29 controls the operation of indoor fan motor 7M for driving indoor fan 7. Sensor input circuit 30 receives detection signals from room temperature sensor 12 and room humidity sensor 13.

As is shown in FIG. 3, RAM 25 includes table 24a for storing condition data, prestored in ROM 24, used to determine an appropriate operating mode during an automatic mode selection operation. More specifically, if in the embodiment described herein, current room temperature $T_A$ is equal to or higher than 28° C., a cooling operation for set temperature $T_S = A$ (26° C.) is selected; if $T_A$ is higher than 24° C. and lower than 28° C., a dehumidifying operating mode for set temperature $T_S = B$ (25° C.) is selected; if $T_S$ is between 23° C. (inclusive) and 24° C. (inclusive), a blowing operation mode is selected; and if $T_A$ is lower than 23° C., a heating operating mode for set temperature $T_S = C$ (23° C.) is selected.

Figure 4:
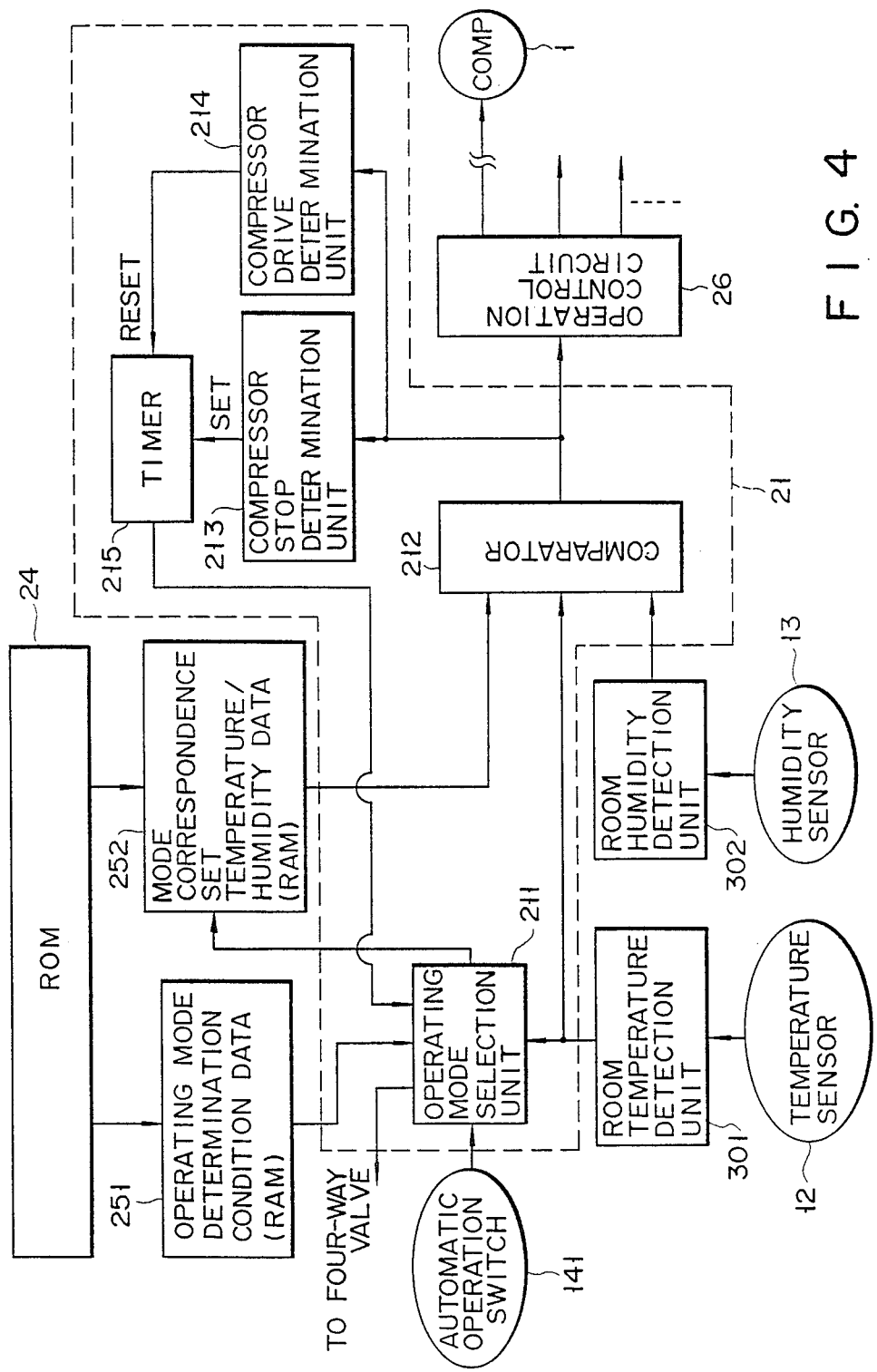

FIG. 4 is a block diagram illustrating control modes of CPU 21. The same reference numerals in FIG. 4 denote the same parts as in FIG. 2. More specifically, when automatic operation switch 141 provided to operating section 14 is depressed, operating mode selection unit 211 in CPU 21 fetches room temperature data from room temperature detection unit 301, and operating mode determination condition data from ROM 24 through RAM 251, and automatically sets a predetermined operating mode corresponding to the input room temperature (initial selection). In response to mode selection data from operating mode selection unit 211, comparator 212 fetches mode correspondence set temperature (humidity) data from ROM 24 through RAM 252. Comparator 212 compares the mode correspondence set temperature (humidity) data with room temperature data from room temperature sensor 12 and room temperature detection unit 301 and/or humidity data from room humidity sensor 13 and room humidity detection unit 302. Then, comparator 212 outputs operation control data to operation control circuit 26. Thus, compressor 1 is controlled in accordance with the initially set mode.

The operation control data from comparator 212 is input to compressor stop determination unit 213 and compressor drive determination unit 214, and is used for monitoring a stop state and a re-drive state from the stop state of compressor 1. Timer 215 is set in a timer operation in response to a compressor stop determination output from unit 213, and monitors whether or not the compressor stop state continues for a predetermined period of time (to be described later). When the compressor stop state exceeds the predetermined period of time, timer 215 supplies re-selection data to operating mode selection unit 211. Thus, operating mode selection unit 211 performs re-selection of an operating mode according to a present room temperature at that time in the same manner as in the initial selection (re-selection).

Note that compressor drive discrimination unit 214 resets the timer operation of timer 215 when a compressor re-drive state is set before the compressor stop state continues for the predetermined period of time.

Figure 5A:
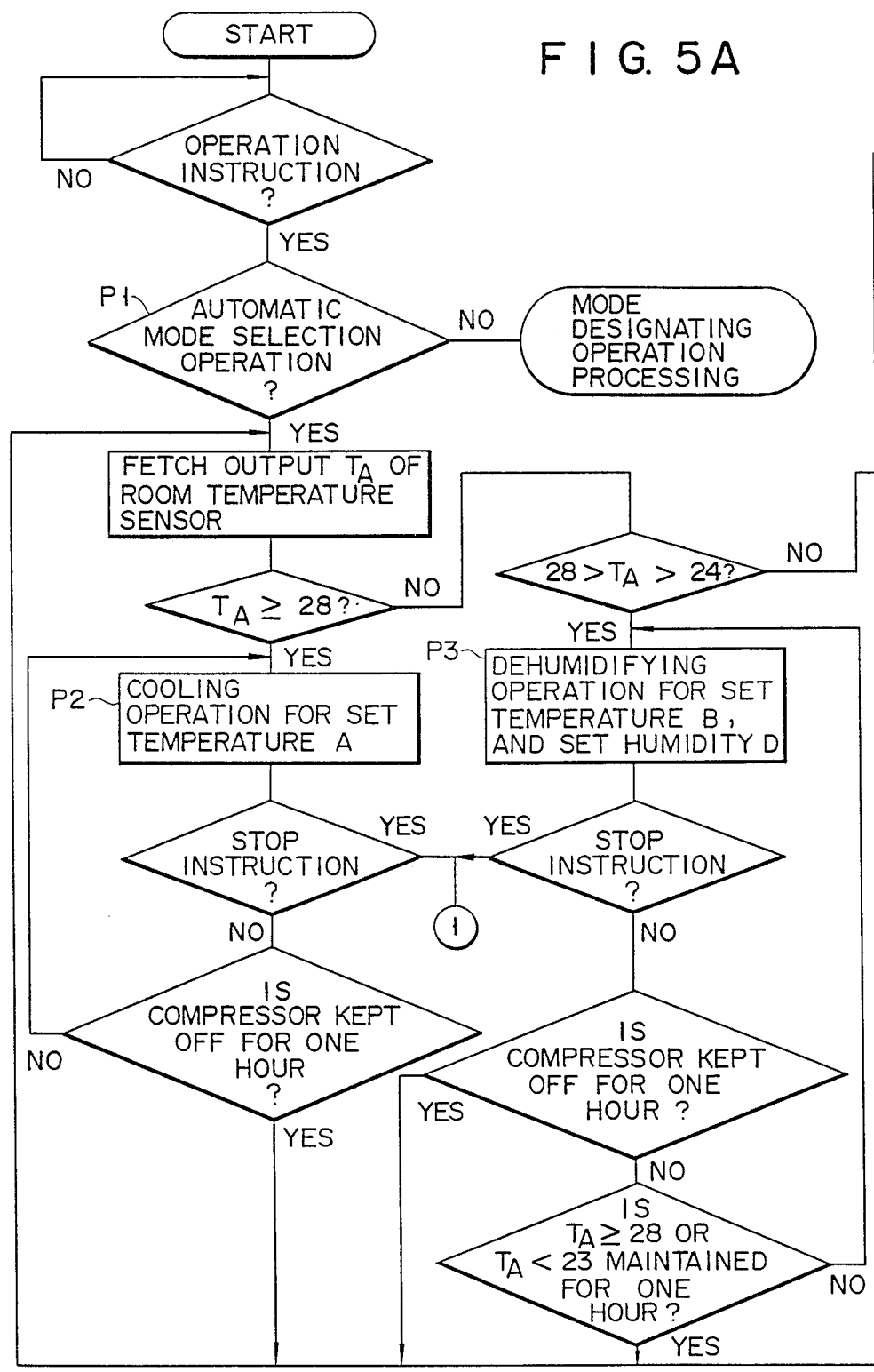
Figure 5B:
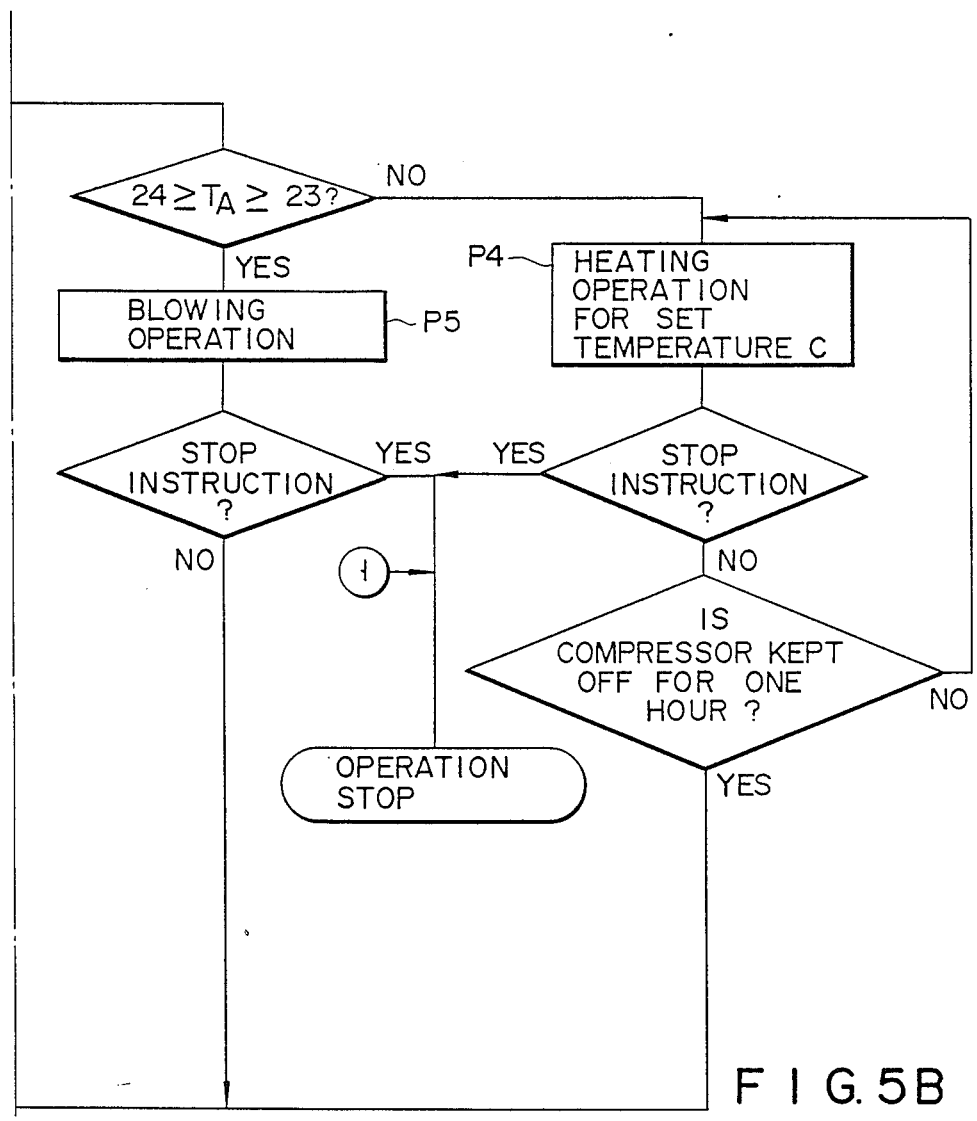

CPU 21 is programmed so as to be operated in accordance with the flow charts shown in FIGS. 5A and 5B. More specifically, when CPU 21 receives an operation instruction from operating section 14, it determines if the instruction corresponds to an automatic mode selection operation instruction or a mode designating operation instruction for designating one of the "cooling", "dehumidifying", "blowing", and "heating", operating modes (P1). If CPU 21 determines in step P1 that the input instruction corresponds to the mode designating operation instruction, it executes a program for starting a predetermined operation in the designated operating mode. However, if CPU 21 determines in step P1 that the input instruction corresponds to the automatic mode selection operation instruction, it fetches room temperature $T_A$ detected by room temperature sensor 12, and compares it with reference temperature data stored in ROM 24. If room temperature $T_A$ is equal to or higher than 28° C., CPU 21 executes a program for starting a cooling operation for set temperature $T_S=A$ (26° C.) (P2); and if $T_A$ is higher than 24° C. and lower than 28° C., it executes a program for starting a dehumidifying operation for set temperature $T_S=B$ (25° C.) and set humidity $H_S=D$ (P3). If room temperature $T_A$ is lower than 23° C., CPU 21 executes a program for starting a heating operation for set temperature $T_S=C$ (23° C.) (P4); and if $T_A$ is between 23° C. (inclusive) and 24° C. (inclusive), it executes a program for starting a blowing operation (P5). If a stop instruction is input from operating section 14 during the operation in each mode, CPU 21 executes an end routine for interrupting the operation of the corresponding mode.

During the cooling operation, if room temperature $T_A$ detected by room temperature sensor 12 becomes lower than set temperature A (26° C.), CPU 21 outputs an operation stop instruction to compressor 1 through operation control circuit 26. Compressor 1 stops its operation. CPU 21 enables a timer function in this state. When the opeation stop state of compressor 1 continues for a predetermined period of time, CPU 21 fetches room temperature $T_A$ detected by room temperature sensor 12 again, and performs automatic re-selection of the operating mode in the same manner as in the initial selection. During the heating operation, if room temperature $T_A$ detected by room temperature sensor 12 becomes higher than set temperature C (23° C.), CPU 21 supplies the operation stop instruction to compressor 1 through operation control circuit 26. Thus, compressor 1 stops its operation. Similarly, if it is detected by the timer function that the operation stop state of compressor 1 continues for a predetermined period of time, CPU 21 performs automatic re-selection of the operating mode. Note that the predetermined period of time is set to be a time (e.g., 1 hour) sufficiently longer than an OFF time of the compressor ON/OFF operations under temperature control in a normal mode designating operation.

During the dehumidifying operation, if room humidity $H_A$ detected by room humidity sensor 13 becomes lower than set humidity D, CPU 21 stops the operation of compressor 1 through operation control circuit 26. If it is detected by the timer operation that the stop state continues for, e.g., an hour, CPU 21 performs automatic re-selection of the operating mode. During the dehumidifying operation, if a state in which room temperature $T_A$ detected by room temperature sensor 12 is equal to or higher than 28° C. or is lower than 23° C. continues for, e.g., an hour, CPU 21 performs automatic re-selection of the operating mode. In the blowing operation, when the room temperature exceeds 24° C., CPU 21 automatically selects the dehumidifying operating mode; and if it becomes lower than 23° C., automatically selects the heating operating mode.

In the air conditioner of this embodiment with the above arrangement, when start of the automatic mode selection operation is instructed by operating section 14, an optimal operating mode is selected in accordance with room temperature $T_A$ detected by room temperature sensor 12, and the corresponding operation is started. Assuming that room temperature $T_A$ is 30° C., since it exceeds a reference temperature of 28° C., the cooling operating mode is automatically selected, and the cooling operation is started. Then, room temperature $T_A$ is gradually decreased, and becomes lower than set temperature A (e.g., 26° C.) at some point. Thereafter, the operation stop instruction is output to compressor 1, and the operation of compressor 1 is stopped. Thereafter, if room temperature $T_A$ does not exceed set temperature A, and the operation stop state of compressor 1 continues for an hour, automatic re-selection of the operating mode is performed. If room temperature $T_A$ at that time is, e.g., 25° C., the dehumidifying operating mode is selected, and the dehumidifying operation is started.

If room temperature is, e.g., 10° C. at the beginning of the automatic mode selection operation, since it is lower than a reference temperature of 23° C., a heating operating mode is automatically selected, and the heating operation is started. Thus, room temperature $T_A$ is gradually increased, and becomes higher than set temperature C (e.g., 23° C.) at some point. Thereafter, the operation stop instruction is output to compressor 1, and the operation of compressor 1 is stopped. Thereafter, if room temperature $T_A$ does not become lower than set temperature C and the operation stop state of compressor 1 continues for an hour, the automatic reselection of the operating mode is performed. If room temperature $T_A$ at that time is, e.g., 23° C., the blowing operating mode is selected, and the blowing operation is started.

If room temperature $T_A$ is, e.g., 25° C. at the beginning of the automatic mode selection operation, since it is higher than 24° C. and lower than 28° C., the dehumidifying operating mode is automatically selected, and the dehumidifying operation is started. Thus, room humidity $H_A$ is gradually decreased, and becomes lower than set humidity D (e.g., 50%). Thereafter, the operation stop instruction is output to compressor 1, and the operation of compressor 1 is stopped. Thereafter, if room humidity $H_A$ does not become higher than set humidity D but the operation stop state of compressor 1 continues for an hour, automatic re-selection of the operating mode is performed. If room temperature $T_A$ at that time is, e.g., 24° C., the blowing operating mode is selected, and the blowing operation is started. During the dehumidifying operation, if room temperature $T_A$ is increased or decreased and a temperature equal to or higher than 28° C. or a temperature lower than 23° C.

continues for an hour, automatic re-selection of the operating mode is performed. Thus, the heating or cooling operation is automatically re-selected.

In this manner, according to this embodiment, when start of the automatic mode selection operation is instructed, the present room temperature is compared with a preset reference temperature, and an optimal operating mode is automatically selected in accordance with the comparison result, thereby starting the corresponding operation. Thereafter, during the cooling, heating, or dehumidifying operation, if the operation stop state of compressor 1 continues for a predetermined period of time (e.g., one hour), it is determined that a load such as a room temperature or humidity is varied from that upon initial mode setting, and automatic reselection of the operating mode is performed. During the dehumidifying operation, if a room temperature is equal to or higher than 28° C. or is lower than 23° C. for a predetermined period of time, the operating mode is re-selected. Therefore, the operating mode can be automatically switched in accordance with a variation in load not only at the beginning of the automatic mode selection operation but also at an efficient interval not disturbing user's comfort. Therefore, after a simple operation is initially performed, an optimal environment can be maintained and comfort in an air-conditioned room can be greatly improved. In particular, in a high-humidity area, the cooling or heating operation and the dehumidifying operation can be efficiently switched in a comfortable state upon instructing an automatic mode selection operation, resulting in great advantages.

The present invention is not limited to the above embodiment. For example, in the above embodiment, an operating mode is automatically selected in accordance with a room temperature. However, upon mode selection, a room humidity may be detected as well as a room temperature, and compared with a reference humidity. If a room temperature is relatively high but a humidity is low, not the dehumidifying operation but the blowing operation may be selected. In the above embodiment, the reference temperatures of 28° C., 24° C., and 23° C. are set, and the predetermined period of time for mode re-selection is set to be an hour. However, these parameters may be appropriately changed. In the above embodiment, the air conditioner in which a re-heater (re-heating heater 8) is driven to perform a dehumidifying operation has been exemplified. However, the present invention can be applied to a known air-conditioner capable of performing a dehumidifying operation without requiring the re-heater. Various other changes and modifications may be made within the spirit and scope of the invention.

According to the present invention as described above, an air conditioner which can greatly improve comfort during the automatic mode selection operation and can efficiently and automatically select an operating mode in accordance with a variation in load can be provided.

What is claimed is:

1. An air conditioner comprising:
   refrigeration cycle means including at least a compressor, an outdoor heat exchanger, a decompressor, and an indoor heat exchanger, and constituting a heat-pump type refrigeration cycle capable of switching between cooling and heating operating modes;
   room temperature detection means for providing room temperature detection data;
   first memory means, for storing first reference temperature data for the cooling operating mode, and second reference temperature data for the heating operating mode;
   second memory means, for storing first set temperature data for setting a cooling temperature, and second set temperature data for setting a heating temperature;
   automatic operation instruction means for providing an automatic operation instruction in an initial state;
   operating mode selection means, connected to said automatic operation instruction means, said room temperature detection means, and said first memory means, for comparing the room temperature detection data with the first and second reference temperature data, in accordance with the automatic operation instruction, and for outputting a first selection signal for selecting the cooling operating mode or a second selection signal for selecting the heating operating mode;
   control means, connected to said operating mode selection means, said room temperature detection means, said second memory means, and said refrigeration cycle means, for setting said heat-pump type refrigeration cycle in the cooling or heating operating mode, in accordance with the first or second selection signal, and controlling said compressor in a drive state or a stop state, so that a comparison difference between the first or second set temperature data and the room temperature detection data becomes zero; and
   monitor means which is connected to monitor the stop state of said compressor in said refrigeration cycle means, and, when the stop state continues for a predetermined period of time or longer, to provide a re-selection instruction equivalent to the automatic operation instruction to said operating mode selection means.

2. An air conditioner according to claim 1, wherein said monitor means includes means for discriminating the stop and drive states of said compressor from the comparison difference by said control means, and timer means which is set in response to a stop state discrimination output from said discrimination means and is reset in response to a drive state discrimination output.

3. An air conditioner according to claim 1, wherein the first reference temperature data is of a value corresponding to a room temperature of 28° C., and the second reference temperature data is of a value corresponding to a room temperature of 23° C.

4. An air conditioner according to claim 3, wherein the first set temperature data is of a value corresponding to a room temperature of 26° C., and the second set temperature data is of a value corresponding to a room temperature of 23° C.

5. An air conditioner according to claim 1, wherein the predetermined period of time is about an hour.

6. An air conditioner according to claim 1, wherein said refrigeration cycle means includes an indoor fan for blowing.

7. An air conditioner comprising:
   refrigeration cycle means including at least a compressor, an outdoor heat exchanger, a decompressor, and an indoor heat exchanger, and constituting a heat-pump type refrigeration cycle capable of switching between cooling, dehumidifying, and heating operating modes;

room temperature detection means for providing room temperature detection data;

room humidity detection means for providing room humidity detection data;

first memory means, for storing first reference temperature data for the cooling operating mode, second reference temperature data for the dehumidifying operating mode, and third reference temperature data for the heating operating mode;

second memory means, for storing first set temperature data for setting a cooling temperature, second set temperature data for setting a dehumidifying temperature, and set humidity data, and third set temperature data for setting a heating temperature;

automatic operation instruction means for providing an automatic operation instruction in an initial state;

operating mode selection means, connected to said automatic operation instruction means, said room temperature detection means, and said first memory means, for comparing the room temperature detection data with the first, second, and third reference temperature data, in accordance with the automatic operation instruction, and for outputting a first selection signal for selecting the cooling operating mode, a second selection signal for selecting the dehumidifying operating mode, or a third selection signal for selecting the heating operating mode;

control means, connected to said operating mode selection means, said room temperature detection means, said room humidity detection means, said second memory means, and said refrigeration cycle means, for setting said heat-pump type refrigeration cycle in the cooling, dehumidifying, or heating operating mode, in accordance with the first, second, or third selection signal, and controlling said compressor in a drive state or a stop state so that a comparison difference between the first, second, or third set temperature data and the room temperature detection data and a comparison difference between the set humidity data and room humidity detection data become zero; and monitor means which is connected to monitor the stop state of said compressor in said refrigeration cycle means, and, when the stop state continues for a predetermined period of time or longer, to provide a re-selection instruction equivalent to the automatic operation instruction to said operating mode selection means.

8. An air conditioner according to claim 7, wherein said monitor means includes means for discriminating the stop and drive states of said compressor based on the comparison difference from said control means, and timer means which is set in response to a stop state discrimination output from said discrimination means and is reset in response to a drive state discrimination output.

9. An air conditioner according to claim 7, wherein the first reference temperature data is of a value corresponding to a room temperature 28° C. or higher, the second reference temperature data is of a value corresponding to a room temperature range of 28° C. (exclusive) to 24° C. (exclusive), and the third reference temperature data is of a value corresponding to a room temperature lower than 23° C.

10. An air conditioner according t claim 7, wherein the first set temperature data is of a value corresponding to a room temperature of 26° C., the second set temperature data is of a value corresponding to a room temperature of 25° C., and the third set temperature data is of a value corresponding to a room temperature of 23° C.

11. An air conditioner according to claim 10, wherein the set humidity data is of a value corresponding to a humidity of 50%.

12. An air conditioner according to claim 7, wherein the predetermined period of time is about an hour.

13. An air conditioner according to claim 7, wherein said refrigeration cycle means includes air indoor fan for blowing.

14. An automatic operation mode-selecting method for an air conditioner comprising:

refrigeration cycle means including at least a compressor, an outdoor heat exchanger, a decompressor, and an indoor heat exchanger, and constituting a heat pump type refrigeration cycle capable of switching between cooling and heating operating modes;

room temperature detection means for providing room temperature detection data;

first memory means, for storing first reference temperature data for the cooling operating mode, and second reference temperature data for the heating operating mode;

second memory means, for storing first set temperature data for setting a cooling temperature, and second set temperature data for setting a heating temperature;

automatic operation instruction means for providing an automatic operation instruction in an initial state;

operating mode selection means, connected to said automatic operation instruction means, said room temperature detection means, and said first memory means, for comparing the room temperature detection data with the first and second reference temperature data, in accordance with the automatic operation instruction, and for outputting a first selection signal for selecting the cooling operating mode or a second selection signal for selecting the heating operating mode;

control means, connected to said operating mode selection means, said room temperature detection means, said second memory means, and said refrigeration cycle means, for setting said heat-pump type refrigeration cycle in the cooling mode, in accordance with the first or second selection signal, and controlling said compressor in a drive state or a stop state, so that a comparison difference between the first or second set temperature data and the room temperature detection data becomes zero; and monitor means which is connected to monitor the stop state of said compressor in said refrigeration cycle means, and, when the stop state continues for a predetermined period of time or longer, to provide a re-selection instruction equivalent to the automatic operation instruction to said operating mode selection means;

said method comprising the steps of:

initially selecting said heat-pump type refrigeration cycle including said compressor in one of cooling, dehumidifying, and heating operation modes, in accordance with said automatic operation instruction in correspondence with a present room temperature in said initial state; and re-selecting, when said stop state of said compressor continues for said predetermined period of time or longer, said heat-pump type refrigeration cycle in one of the cooling, dehumidifying, and heating operation modes, in correspondence with a present room temperature at that time.

* * * * *